United States Patent Office 3,103,465
Patented Sept. 10, 1963

3,103,465
BIRD REPELLENT COMPOSITION
Lyle D. Goodhue, Kenneth E. Cantrel, and Rector P. Louthan, Bartlesville, Okla., assignors to Phillips Petroleum Company, a corporation of Delaware
No Drawing. Filed May 23, 1960, Ser. No. 30,738
10 Claims. (Cl. 167—46)

This invention relates to repelling birds. In one of its aspects, it relates to a method of repelling birds employing a certain selected sulfide as defined herein. In another of its aspects, the invention relates to a bird repellent composition containing a certain selected sulfide as defined herein. In a further aspect of the invention, it relates to a method of protecting a crop employing a certain selected sulfide as defined herein, to repel birds therefrom. In a further aspect of the invention, it relates to a protected seed, said seed having been impregnated with a selected sulfide as defined herein. In a further aspect still, the invention relates to a protected feed which has been impregnated with a bird repellent sulfide as defined herein. In another aspect of the invention, it relates to repelling birds from buildings by applying to the buildings a selected sulfide as defined herein.

A number of repellents for certain pests, such as insects and rodents, have been developed and now known. However, while it would be very desirable to discover materials which are repellent to birds, very little success has been achieved in this area. It is estimated that the loss of grain at the present time because of consumption by birds amounts to many millions of dollars each year. Bird repellents which will prevent or substantially reduce consumption of grain and feed, etc., would thus represent an economic boon to the farmer. Furthermore, the use of bird repellents on window sills, facings, and the like would also prevent these architectural pests from fouling such locations.

An object of this invention is to provide a method for repelling birds. Another object of this invention is to provide a new bird repellent composition. Still another object of this invention is to provide a method for rendering surfaces repellent to birds. A further object of this invention is to protect a grain or seed from consumption by birds. A still further object of this invention is to provide a bird repellent grain or seed.

We have now discovered that compounds of the formulas (I)   $R_1-(S)_x-R_1$ and (II)   $R_2-S-R_2$ wherein each $R_1$ is an alkyl radical containing from 1 to 12 carbon atoms, inclusive, $x$ is an integer of from 2 to 8, inclusive, and each $R_2$ is selected from the group consisting of aryl, alkaryl, and aralkyl radicals containing from 6 to 12 carbon atoms, inclusive, are excellent repellents for birds.

Some examples of compounds falling within the scope of the above formulas are:

Di-n-butyl pentasulfide
Dimethyl trisulfide
Di-n-propyl tetrasulfide
Di-tert-butyl hexasulfide
Di-sec-octyl heptasulfide
Diethyl octasulfide
n-Propyl n-butyl pentasulfide
Di-n-decyl tetrasulfide
Di-tert-dodecyl hexasulfide
Diphenyl sulfide
Dibenzyl sulfide
Di-p-tolyl sulfide
Di(4-phenylhexyl) sulfide
Dinaphthyl sulfide
Di(2-ethylnaphthyl) sulfide
Di(4-n-hexylphenyl) sulfide and the like.

The bird repellents of this invention can be applied as the pure compound, or in combination with carriers or inert materials as in solutions or emulsions. Solvents or carriers should be used which are substantially inert with respect to the active repellent. Some examples of carrier materials which can be employed are Acetone
Deodorized kerosene
Naphthas
Isoparaffinic hydrocarbon fractions boiling in the approximate range of 260–800° F. (Soltrol)
Paraffinic hydrocarbon fractions boiling in the approximate range of 300–600° F. (base oils)

and the like. The bird repellents of this invention can also be applied as aqueous emulsions, in which case a suitable emulsifying or wetting agent is employed. The repellents can also be applied as dusts, using such solid carriers ar kieselguhr, and the like. In addition, the materials for repelling birds can be applied to surfaces from which it is desired to repel these animals in conjunction with an adhesive.

The bird repellents of this invention can be applied in the above-described forms by spraying, brushing, dusting, etc. The usually preferred method of application is by spraying a liquid composition onto the surface to be treated. When applying the repellents of this invention in a solvent or carrier, the liquid compositions will normally contain from 0.1 to 10 weight percent of one of the above-described sulfides, although concentrations above and below this range can be used. When these materials are applied in the form of dusts, the concentration of the active ingredient is preferably within the range between 1 and 20 weight percent, although concentrations above and below this range can be employed.

The bird repellents of this invention are usually applied to a surface in a manner so as to deposit an amount within the range between 1 and 10 grams of the active repellent material per each 100 square feet of surface from which birds are to be repelled. Larger or smaller amounts can be applied, if desired, although larger amounts are generally uneconomical.

When the bird repellents of this invention are applied to feed, grain, or the like, application is made so as to deposit between 0.05 and 5 weight percent, based on the feed, of the active repellent. A more preferred range is from 0.1 to 2 weight percent. Some examples of feed and grain which are consumed by birds, and which can be treated according to this invention, are Rice
Wheat
Barley
Oats
Corn
Rye
Sorghum grains fruit and planted seeds of flowers, vegetables, and the like.

The bird repellents of this invention are known compounds, and can be prepared by several known methods. For example, dialkyl disulfides can be converted to higher sulfides by contacting said disulfide together with sulfur in the presence of a catalyst such as bauxite. Another method for the production of such compounds is the oxidation of aromatic mercaptans. Still another method for the preparation of these compounds is by the reaction of alkyl mercaptans with sulfur chlorides.

The following specific examples are intended to illustrate the effectiveness of certain selected sulfides as bird repellents. It is to be understood that these examples are illustrative and that the invention is not intended to be limited to these specific examples.

EXAMPLE I

A number of runs was carried out in which certain sulfides were tested as repellents for Coturnix quail.

In each of these runs, 100 grams of feed were treated with a solution of 1 gram of one of the sulfides of this invention dissolved in 40 cc. of acetone. In each run, the solvent was evaporated, and the dried feed was placed in a cage with four hungry Coturnix quail. The amount of feed consumed by the quail on the first and second days was estimated, and the amount remaining the third day was determined by weighing. The quail will eat all of the 100 grams on the first day if the treating agent is not repellent, or if the feed is not treated. The results of these tests are set forth in Table I.

Table I

|  | Grams Feed Eaten | | |
|---|---|---|---|
|  | Estimated | | Actual, 3rd Day |
|  | 1st Day | 2nd Day |  |
| di-n-butyl pentasulfide | 10 | 25 | 47 |
| di-n-octyl pentasulfide | 15 | 50 | 100 |
| diphenyl sulfide | 10 |  | 38 |

EXAMPLE II

A number of runs was also carried out in which certain sulfides, including many outside of the scope of this invention, were tested as repellents for baby chickens.

In each of these runs, a solution of 0.5 gram of the desired sulfide dissolved in 20 cc. of acetone was applied to 50 grams of prepared chicken feed. In each run, the chicken feed was thoroughly mixed with the solution, after which the acetone was evaporated from the feed. Fifty grams of the treated feed were then placed in each run in a cage with two hungry baby chickens. As in Example I, the amounts of treated feed remaining at the end of the first and second days were estimated, and on the third and final day, the amount of feed consumed was determined by weighing, unless all of the feed had been eaten. Untreated feed was completely consumed before the end of the first day. The results of these runs are expressed below as Table II.

Table II

| Compound | Grams Feed Eaten | | |
|---|---|---|---|
|  | Estimated | | Actual, 3rd Day |
|  | 1st Day | 2nd Day |  |
| diphenyl sulfide | 20 | 20 | 26 |
| di-tert-butyl disulfide | 20 | 25 | 36 |
| di-tert-octyl disulfide | 25 | 30 | 50 |
| 3-phenylpropyl n-octyl sulfide | 50 |  |  |
| cyclohexyl n-octyl sulfide | 50 |  |  |
| sec-octyl ethyl sulfide | 50 |  |  |
| n-octyl ethyl sulfide | 50 |  |  |
| tert-octyl methyl sulfide | 50 |  |  |
| n-octyl methyl sulfide | 50 |  |  |
| n-heptyl n-amyl sulfide | 50 |  |  |
| n-heptyl n-butyl sulfide | 50 |  |  |
| n-heptyl n-propyl sulfide | 50 |  |  |
| n-hexyl n-amyl sulfide | 50 |  |  |
| n-hexyl n-butyl sulfide | 50 |  |  |
| ethyl hexyl sulfide | 50 |  |  |
| n-butyl n-propyl sulfide | 50 |  |  |

In the above table, the first three runs represent compounds falling within the scope of this invention, while all others are control runs.

From the foregoing table it is evident that the monosulfides which were essentially aliphatic in character, i.e., did not have their $R_2$'s selected entirely from aryl, alkaryl and aralkyl radicals containing from 6 to 12 carbon atoms, to which the $R_2$'s of the invention are limited, did not possess sufficient repellency to prevent approximately 50 percent of the feed from being eaten the first day.

EXAMPLE III

In this example, pans of treated and untreated grain were exposed to birds on the roof of a building in a municipal area heavily frequented by sparrows, pigeons, and other varieties of birds.

An amount of 340 grams (500 ml.) of grain sorghum was treated with a solution of 3.4 grams of di-n-butyl pentasulfide dissolved in 20 cc. of acetone. The solvent was then evaporated off, and the treated grain was placed in a pan in the above-described location. A pan containing the same amount of untreated grain was placed in the same location. Daily observations were made on the amounts of treated and untreated grain which had been consumed by the birds. Since the untreated grain was eaten very rapidly, it was necessary to replenish the untreated grain a number of times. The effectiveness of the repellent was calculated by the formula:

Percent repellency =
$$100 - \frac{\text{Amount of treated grain consumed during 10 day period}}{\text{Amount of untreated grain consumed during 10 day period}} \times 100$$

By the method of this example, the di-n-butyl pentasulfide was 99.62 percent repellent.

EXAMPLE IV

In still another run, a 5 percent by weight solution of di-n-butyl pentasulfide in a paraffinic oil of 350–550 boiling range (No. 1 base oil) was applied to grain sorghum in the field by spraying the solution over the heads of the grain. Three liters of this solution were applied to 200 feet of row. Practically no feeding was observed during a 37 day period. During the same period, adjacent control rows of grain which were not treated with the bird solution were practically all eaten.

Reasonable variation and modification are possible within the scope of the foregoing disclosure and the appended claims to the invention the essence of which is that certain selected sulfides as defined herein have been found to be repellent to birds and that methods and compositions dependent upon the repellent property of said sulfides have been set forth and described.

We claim:

1. A method of protecting grain sorghum in the field against being eaten by birds which comprises spraying over the heads of the grain sorghum when it is in the stage at which birds will eat the grain therefrom a compound selected from the group of compounds having the following structural characteristics (Formula I) 

and (Formula II) 

wherein each $R_1$ is an alkyl radical containing from 1 to 12 carbon atoms, inclusive, $x$ is an integer of from 2 to 8, inclusive, and each $R_2$ is selected from the group consisting of aryl, alkaryl and aralkyl radicals containing from 6 to 12 carbon atoms.

2. A method of protecting grain sorghum in the field which comprises applying thereto at a time when birds will eat the grain therefrom a compound selected from the group consisting of Formulas I and II of claim 1.

3. A method of protecting a surface against birds which comprises applying to said surface a compound selected from the group consisting of Formulas I and II of claim 1.

4. A method of protecting feed against birds which comprises impregnating said feed with a compound selected from the group consisting of Formulas I and II of claim 1.

5. A method of protecting grain against birds which comprises impregnating said grain with a compound selected from the group consisting of Formulas I and II of claim 1.

6. A feed composition protected against birds which comprises a feed impregnated with a compound selected from the group consisting of Formulas I and II of claim 1.

7. A grain protected against birds which comprises a grain impregnated with a compound selected from the group consisting of Formulas I and II of claim 1.

8. A seed protected against birds which comprises a seed impregnated with a compound selected from the group consisting of Formulas I and II of claim 1.

9. A surface protected against birds which comprises a surface which has been protected against birds by applying thereto a compound selected from the group consisting of Formulas I and II of claim 1.

10. A method of protecting a seed against birds which comprises impregnating the seed with a compound selected from the group consisting of Formulas I and II of claim 1.

References Cited in the file of this patent

UNITED STATES PATENTS

| | | |
|---|---|---|
| 2,043,941 | Williams | June 9, 1936 |
| 2,100,351 | Patrick | Nov. 30, 1937 |
| 2,917,429 | Scott et al. | Dec. 15, 1959 |